(12) United States Patent
Isozaki et al.

(10) Patent No.: US 9,963,098 B2
(45) Date of Patent: *May 8, 2018

(54) VEHICLE OCCUPANT RESTRAINT DEVICE

(71) Applicant: TAKATA CORPORATION, Tokyo (JP)

(72) Inventors: Hiroaki Isozaki, Tokyo (JP); Yoshiki Murakami, Tokyo (JP); Hikaru Kameyoshi, Tokyo (JP)

(73) Assignee: TAKATA CORPORATION, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/318,230

(22) PCT Filed: Mar. 23, 2015

(86) PCT No.: PCT/JP2015/058728
§ 371 (c)(1),
(2) Date: Dec. 12, 2016

(87) PCT Pub. No.: WO2015/190152
PCT Pub. Date: Dec. 17, 2015

(65) Prior Publication Data
US 2017/0106828 A1    Apr. 20, 2017

(30) Foreign Application Priority Data

Jun. 14, 2014 (JP) ................................. 2014-122938

(51) Int. Cl.
*B60R 21/18* (2006.01)
*B60R 21/2338* (2011.01)
*B60R 21/235* (2006.01)
*B60R 21/237* (2006.01)

(52) U.S. Cl.
CPC ............ *B60R 21/18* (2013.01); *B60R 21/235* (2013.01); *B60R 21/237* (2013.01);
(Continued)

(58) Field of Classification Search
CPC ...... B60R 21/18; B60R 21/235; B60R 21/237
See application file for complete search history.

(56) References Cited

U.S. PATENT DOCUMENTS

| 5,282,648 A | 2/1994 | Peterson |
| 6,189,921 B1 | 2/2001 | Takeuchi |

(Continued)

FOREIGN PATENT DOCUMENTS

| DE | 10 2004 007 768 A | 6/2006 |
| JP | H11-078777 A | 3/1999 |

(Continued)

OTHER PUBLICATIONS

International Search Report issued in International Patent Application No. PCT/JP2015/058728 dated May 12, 2015.

*Primary Examiner* — Faye M Fleming
(74) *Attorney, Agent, or Firm* — Foley & Lardner LLP

(57) ABSTRACT

A vehicle occupant restraint device includes an airbag that is provided in a shoulder belt position of a seat belt while being folded in a belt-like shape to be capable of inflating upon receiving a predetermined actuating signal, and the seat belt is wound by a single winding device. The airbag is folded to surround a slide guide including a hard member having seat-belt passing portions arranged at predetermined intervals in an insertion direction of webbing and a soft member supporting the hard member. The airbag smoothly slides along the webbing through the slide guide when the seat belt is pulled out.

10 Claims, 9 Drawing Sheets

(52) U.S. Cl.
    CPC ............... *B60R 21/2338* (2013.01); *B60R 2021/23509* (2013.01); *B60R 2021/23519* (2013.01)

(56) References Cited

U.S. PATENT DOCUMENTS

| | | | |
|---|---|---|---|
| 6,340,173 B1 * | 1/2002 | Specht | B60R 21/18 |
| | | | 280/733 |
| 8,882,141 B2 * | 11/2014 | Arnold | B60R 21/18 |
| | | | 280/733 |
| 9,199,599 B2 * | 12/2015 | Yamataki | B60R 21/18 |
| 2007/0080528 A1 | 4/2007 | Itoga et al. | |
| 2013/0313811 A1 | 11/2013 | Ichida et al. | |
| 2014/0151986 A1 | 6/2014 | Kim | |
| 2014/0353950 A1 | 12/2014 | Yamataki et al. | |

FOREIGN PATENT DOCUMENTS

| | | | |
|---|---|---|---|
| JP | 2000-142303 A | 5/2000 | |
| JP | 2001-260807 A | 9/2001 | |
| JP | 2004-058698 A | 2/2004 | |
| JP | 2007-126123 A | 5/2007 | |
| JP | 2007-131225 A | 5/2007 | |
| JP | 2009-029355 A | 2/2009 | |
| JP | 2009-029357 A | 2/2009 | |
| JP | 2010-036836 A | 2/2010 | |
| JP | 2013-184559 A | 9/2013 | |
| JP | 2013-244857 A | 12/2013 | |
| WO | WO-2013/105639 A1 | 7/2013 | |
| WO | WO-2013/107951 A | 7/2013 | |

* cited by examiner

VEHICLE OCCUPANT RESTRAINT DEVICE

CROSS-REFERENCE TO RELATED APPLICATIONS

The present application is a U.S. national stage application of International Patent Application No. PCT/JP2015/058728, filed Mar. 23, 2015, which claims the benefit of priority to Japanese Patent Application No. 2014-122938, filed Jun. 14, 2014, the entireties of which are hereby incorporated by reference.

TECHNICAL FIELD

The present invention relates to a vehicle occupant restraint device, and more particularly, to a vehicle occupant restraint device that detects the collision of a vehicle so as to be effective in restraining an occupant by causing an airbag which is folded inside a seat belt to be inflated from the chest to the shoulder.

BACKGROUND ART

As a vehicle occupant restraint device for protecting an occupant from two types of accidents such as a frontal collision and a lateral collision with one product, there has been developed an air belt device in which an airbag accommodated in a shoulder belt of a seat belt is inflated around a shoulder top from a chest in the event of a vehicle collision, thus restraining an occupant.

This air belt device is operated such that an airbag is inflated along a shoulder belt fastened to an occupant in a substantially spindle shape, and the airbag in the belt is directly inflated in the event of the frontal collision, thus increasing a contact area with an occupant's chest, distributing and cushioning impacts applied to the chest. In the event of the lateral collision, an inflated portion of the airbag restrains a region extending from a shoulder top to a temporal region of an occupant, and controls a lateral movement amount of a head, thus preventing a secondary collision due to a side window or an interior structure of a vehicle.

When this air belt device is operated by one retractor, it is necessary to pull out and take up the shoulder belt accommodating the air belt and a lap belt interposing a tongue plate therebetween. Particularly when webbing is pulled out from the retractor, the air belt portion needs to smoothly slide against the webbing such that the air belt portion (a portion of the shoulder belt) having a tongue in which the tongue plate and a gas supply hole are formed in an end thereof is provided at a proper position in a region from the chest to the shoulder while a predetermined amount of lap belt portion is pulled out.

In Patent Literature 1, there is disclosed a seat belt device having a flat tube made of a synthetic resin material and interposed between an airbag body and webbing. In Patent Literature 1, there are disclosed various kinds of tubes that are variously adjusted in rigidity (longitudinal and width directions of the tube) so as to ensure follow-up properties and flexibility when the webbing is pulled out while reducing the sliding resistance of the webbing that has been inserted into and passed through the flat tube. In Patent Literature 1, FIG. 4 illustrates a section of the device when the tube is integrally coupled with the airbag body. The airbag is inflated from the accommodated state of FIG. 4 in the event of a collision, between an occupant restrained by the seat belt and an interior structure of the vehicle. Therefore, a secondary collision between an occupant and the interior structure of the vehicle, such as a steering wheel or a dashboard, is prevented.

An applicant has proposed a vehicle occupant restraint device that overcomes the problems of the seat belt device disclosed in Patent Literature 1, and adopts a slide guide having sufficient rigidity by combining a high rigidity region and a low rigidity region to webbing, thus allowing the webbing to be smoothly pulled out and mounted while a seat belt is fit for an occupant's body type when he or she fastens the seat belt (Patent Literature 2).

CITATION LIST

Patent Literature

[Patent Literature 1]: JP-A-2009-29355
[Patent Literature 2]: WO/2013/105639

SUMMARY OF INVENTION

Technical Problem

The seat belt device described in Patent Literature 1 is disposed with various openings or notches in surfaces of the above-described various flat tubes so as to reduce rigidity in two directions, namely, a longitudinal direction and a width direction, so that the rigidity of the tube in the width direction is easily reduced. Therefore, this seat belt device is problematic in that, when an occupant holds an air belt portion and pulls the air belt out from a retractor so as to fasten the seat belt, the tube is deformed to cause the webbing to be rolled up, or is pushed in a thickness direction to come into contact with the tube and thereby fit the webbing therebetween, thus consequently increasing sliding resistance when the seat belt is pulled out.

Further, this seat belt device is operated such that the seat belt directly restrains an occupant's chest, and an inflated airbag independently restrains the occupant from being moved forwards. Therefore, until the forward movement of the occupant is restrained by the airbag, the restraint of his or her chest by the seat belt is likely to increase more than necessary.

The invention disclosed in Patent Literature 2 solves the problems occurring in Patent Literature 1. However, the invention disclosed in Patent Literature 2 is configured such that a region through which the webbing is inserted and passes desirably includes a high rigidity region, because sliding resistance of resin used for the low rigidity region among the slide guide having both the high and low rigidity regions increases. Further, it is necessary to ensure the strength of a coupling region between the high and low rigidity regions and improve durability. In addition, it is preferable to reduce the weight of members and enhance the assemblability of parts, in order to guarantee comfortability when the air belt device is fastened or to reduce the manufacturing cost of the air belt device.

Therefore, an object of the present invention is to solve the problems occurring in the related art, and is to provide a vehicle occupant restraint device, including a slide guide which has high rigidity in a width direction and a thickness direction of webbing, has low rigidity in a longitudinal direction thereof, and is manufactured in light weight and at low cost, thus allowing an air belt device to be smoothly moved along the webbing, enabling the air belt device to be properly fastened to an occupant's chest, and allowing his or her chest to be restrained without being locally compressed when the airbag is inflated.

Solution to Problem

In order to achieve the above object, the present invention is characterized by being provided with a vehicle occupant restraint device including an airbag that is provided in a shoulder belt position of a seat belt to be capable of inflating upon receiving a predetermined actuating signal, the seat belt being wound by a single winding device, wherein the airbag is folded to surround a slide guide including a high rigidity region and a low rigidity region, the high rigidity region having seat-belt passing portions arranged at predetermined intervals in an insertion direction of the seat belt, the low rigidity region supporting the high rigidity region, and the airbag slides along the seat belt through the slide guide when the seat belt is pulled out.

It is preferable that the high rigidity region is a cylindrical member that is made of a hard member and has seat-belt passage openings arranged at a predetermined interval along a soft member as the low rigidity region extending in a longitudinal direction of the airbag.

It is preferable that the soft member is a strip-shaped cloth member, and is connected to an outer surface of the hard member by bonding, welding or sewing.

It is preferable that the soft member is a line-shaped member, and is connected to the hard member in a line-shaped member attachment region formed in a portion of the hard member.

It is preferable that wherein the soft member is a tether which restricts inflation of the airbag, or an airbag body.

It is preferable that the high rigidity region of the slide guide is a molded body made of a hard resin material, and the low rigidity region thereof is a molded body made of a soft resin material.

It is preferable that the slide guide is a molded product obtained by two-color molding of the hard resin material and the soft resin material.

It is preferable that the molded product of the hard resin material of the slide guide and the molded product of the soft resin material thereof are connected to each other by a mechanical connecting unit.

It is preferable that the mechanical connecting unit is either of a caulking structure or a fitting structure.

Advantageous Effects of Invention

According to the present invention, it is possible to manufacture the slide guide, in light weight and at low cost, which allows an air belt portion to smoothly slide along a shoulder belt upon pulling out webbing when an occupant wears a seat belt, and it is possible to sufficiently ensure comfortability when the seat belt is fastened due to the performance of a product, whereby it is possible to fasten the air belt device at a proper position.

BRIEF DESCRIPTION OF DRAWINGS

FIG. 6B-1 is a schematic front view illustrating the slide guide of FIG. 6A.

FIG. 6B-2 is a schematic side view illustrating the slide guide of FIG. 6A.

FIG. 7B-1 is a sectional view of the slide guide of FIG. 7A.

FIG. 7B-2 is a sectional view illustrating another example of the slide guide of FIG. 7A.

FIG. 7B-3 is a sectional view illustrating another example of the slide guide of FIG. 7A.

FIG. 7B-4 is a sectional view illustrating another example of the slide guide of FIG. 7A.

FIG. 7C-1 is a top view illustrating a positioning stopper of the slide guide of FIG. 7A.

FIG. 7C-2 is a top view illustrating the positioning stopper of the slide guide of FIG. 7A.

FIG. 8B-1 is a sectional view illustrating the slide guide of FIG. 8A.

FIG. 8B-2 is a sectional view illustrating another example of the slide guide of FIG. 8A.

FIG. 8B-3 is a sectional view illustrating another example of the slide guide of FIG. 8A.

DESCRIPTION OF EMBODIMENTS

Hereinafter, an embodiment for carrying out a vehicle occupant restraint device of the present invention will be described with reference to the accompanying drawings.

Figure 1:
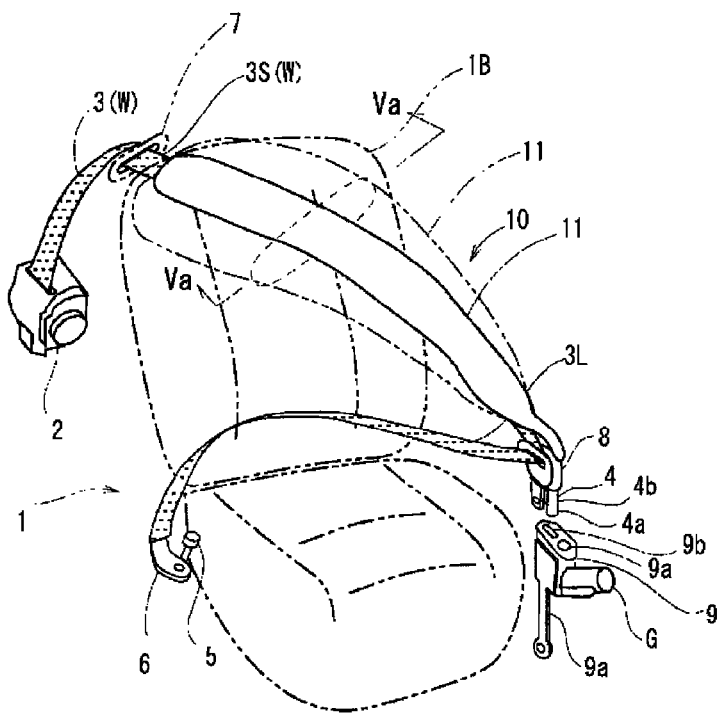
FIG. 1 is a perspective view illustrating a configuration example of vehicular equipment into which a vehicle occupant restraint device of the present invention is incorporated.

FIG. 1 is a perspective view schematically illustrating a state in which an occupant seat 1 is equipped with a vehicle occupant restraint device 10 of the present invention (hereinafter also referred to as an air belt device 10 in the present invention). As illustrated in the drawing, a seat belt 3 pulled out from a retractor 2 is bent towards a tongue 4, and is anchored at an end thereof to an anchor plate 6. This anchor plate 6 is fixed to a fixing part of a vehicular body through a fixing bolt 5. Further, in the following description, the term "seat belt" means a case of restraining an occupant or obtaining a restraint function, or a region (e.g. a shoulder belt, etc.) associated therewith. The term "webbing" means a woven cloth strip constituting the seat belt that is wound on the retractor and is pulled out by a predetermined pulling force.

As illustrated in FIG. 1, the retractor 2 is accommodated in a B pillar or a seat back 1B, and is fixed at a predetermined position. The webbing W is wound while retaining a predetermined tension at a seat side when an occupant sits initially. The webbing W is divided into a shoulder belt 3S and a lap belt 3L, based on a position of the tongue 4. The webbing W forming the lap belt 3L is a portion that is wound on the retractor 2 except when in use. When an occupant sits in the seat, pulls the webbing W out from the retractor 2 and then draws the tongue 4 to a buckle 9, as illustrated in FIG. 1, the portion of the lap belt 3L is ensured. At this time, the occupant holds the webbing W located in his or her side and pulls it out from the retractor 2 while sitting in the seat. This position corresponds to the air belt 11 of the shoulder belt 3S in which the airbag 20 is folded and accommodated. An object of the present invention is to prevent the webbing W from being rolled up even if the webbing W is held when the air belt 11 is pulled out. A configuration for realizing this object will be described below with reference to FIGS. 4 to 8.

Figure 2:
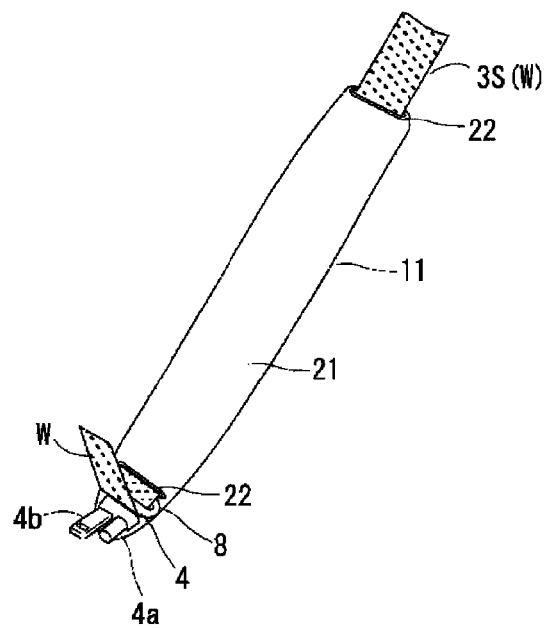
FIG. 2 is a view illustrating a schematic configuration of the vehicle occupant restraint device of FIG. 1.

Another configuration of the air belt device 10 illustrated in FIG. 1 will be described in detail. A shoulder anchor 7 is installed at an upper end of a right shoulder side of the seat back 1B. The shoulder anchor 7 is usually formed on an upper portion of a B pillar or an upper end of the seat back 1B, so that a direction of the shoulder belt 3S is changed through the shoulder anchor 7 and thereby the shoulder belt is guided into the retractor 2. Meanwhile, as illustrated in FIG. 2 in an extracted state, the air belt 11 (its configuration will be described later) is mounted on the webbing W forming the shoulder belt 3S. As illustrated in FIGS. 1 and 2, the end of the air belt 11 of the present invention is shaped such that the tongue 4 and the lap anchor 8 are integrated. A gas supply pipe 4a and a tongue plate 4b are formed on the tongue 4 made of a synthetic resin material. The gas supply pipe 4a is a metallic cylindrical member, and a gas supply path in the tongue 4 communicating with the gas supply pipe 4a is airtightly connected to a gas inlet port 20a located at an end of a bag body 24 of the airbag 20 illustrated in FIG. 3.

FIG. 1 further illustrates the buckle 9 intended to retain the gas supply pipe 4a and the tongue plate 4b of the tongue 4. This buckle 9 is fixed to the fixing part of the vehicular body on the seat side through a bracket 9a, using a fixing member such as a bolt or the like. A tongue-plate support hole 9b and a gas-supply-pipe connection hole 9a are formed in the buckle 9, and the tongue plate 4b and the gas supply pipe 4a are simultaneously inserted into the respective holes of the buckle 9 when the tongue 4 is fastened. A gas outlet port of an inflator G externally attached to the buckle 9 communicates with the connection hole into which the gas supply pipe 4a is inserted. Thus, in the event of a collision or the like, if an actuating signal is sent to the inflator G, an ignition agent in the inflator G is ignited, so that gas is jetted from the gas outlet port of the inflator G, and the airbag 20 (see FIG. 3) is inflated, through the gas supply pipe 4a, in a substantially spindle shape along the shoulder belt 3S worn by an occupant. At this time, the airbag has a section that is flat and substantially elliptical, when viewed from line Va-Va of FIG. 1 (see FIG. 5A). Therefore, the webbing W may properly restrain a wide range from the chest to the shoulder of an occupant (in FIG. 1, the inflated shape is shown by an imaginary line).

In this regard, the configuration of the air belt 11 that is slidably mounted to the webbing W of the shoulder belt 3S will be described with reference to FIGS. 2 and 3. FIG. 2 is an external view illustrating the air belt 11 through which the webbing W of the shoulder belt 3S is inserted and passes. The air belt 11 illustrated in the drawing accommodates multiple slide guides (configuration will be described later) arranged in the longitudinal direction of the webbing W, as a core member, the bag body 24 is folded in three to form an elongated shape along the webbing W, from a deployed state illustrated in FIG. 3, and then the entire part is covered with an outer cover 21. The outer cover 21 is made by sewing cloth in a cylindrical shape, and sewing yarn is cut at predetermined spots during an operation, so that a portion of the outer cover 21 is opened and the airbag 20 inflated from that portion is exposed.

An opening guide ring 22 made of a polyurethane resin material is attached to an opening formed in each of opposite ends of the outer cover 21. This opening guide ring 22 is rarely deformed because of high rigidity, and the webbing W may easily slide and the sliding resistance of the webbing W is also reduced at the time of being pulled out because the shape of the flat opening is retained.

Figure 3:
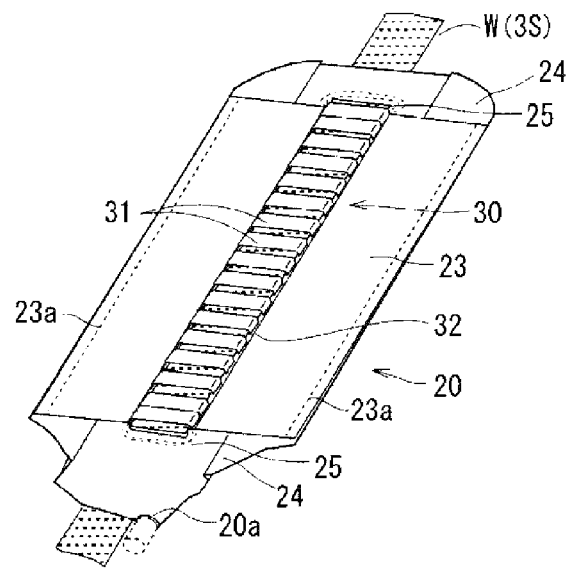
FIG. 3 is a schematic view illustrating an internal configuration of the vehicle occupant restraint device of FIG. 2.
Figure 4:
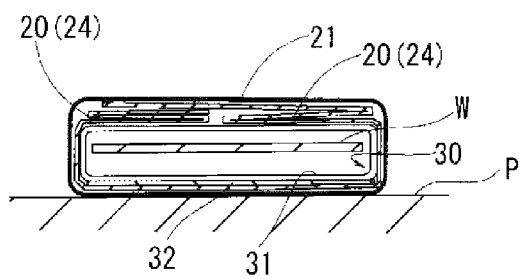
FIG. 4 is a partially enlarged sectional view illustrating an example of a section of the vehicle occupant restraint device according to the present invention.
Figure 5A:
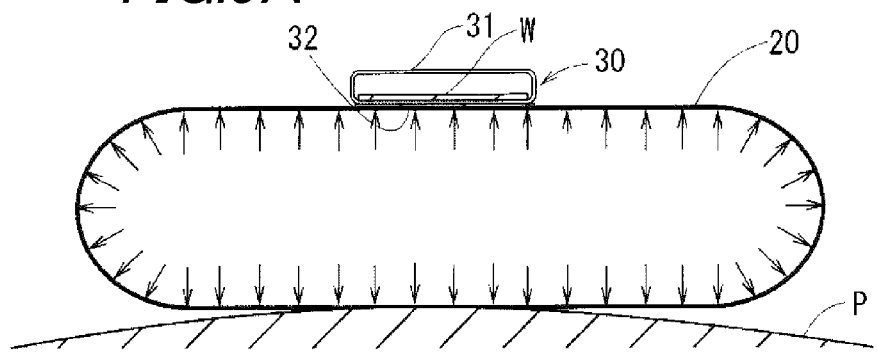
FIG. 5A is a partially enlarged view illustrating a relationship between an inflated state of the vehicle occupant restraint device of FIG. 4 and an occupant.
Figure 5B:
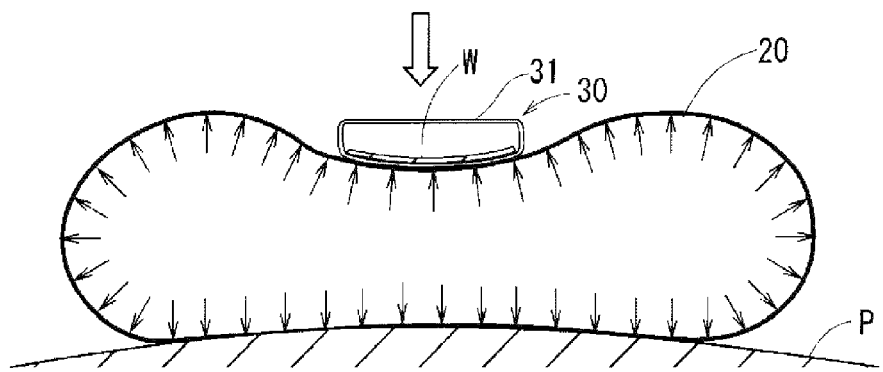
FIG. 5B is a partially enlarged view illustrating a relationship between an inflated state of the vehicle occupant restraint device of FIG. 4 and the occupant.

Although various shapes have been proposed for the airbag 20 functioning as the air belt 11, a deployed state of an example of the airbag shape is illustrated in FIG. 3. Since this airbag 20 forms a sectional shape of FIG. 4 in a folded state and an end 23a of a longitudinal tether 23 is sewn in the longitudinal direction of the bag body 24, the airbag is inflated in the shape of a section that is flat and substantially elliptical, as illustrated in FIG. 5A. Thus, even if tension acting on the webbing W increases when the airbag 20 is inflated between an occupant and the webbing W and the seat belt is introduced, the occupant P is not locally tightened by the webbing W, and, as illustrated in FIG. 5B, pressing force from the webbing W acts on a wide range including the chest and the waist of the occupant P, through the airbag 20 located between the occupant P and the webbing W.

As illustrated in FIG. 3, the airbag 20 functioning as the air belt 11 is slidably retained at a portion of the shoulder belt 3S by inserting the webbing W into slits 25 of two spots formed in the vicinity of an end of the airbag 20 in the longitudinal direction thereof. As illustrated in the drawing, the air belt 11 (see FIG. 2) is shaped as follows: the webbing W is inserted into the slide guide 30 having predetermined rigidity and bending flexibility, the airbag 20 on each side of the webbing W is folded to surround the slide guide 30, thereby being covered with the mesh webbing and the outer cover 21.

To be more specific, the sectional configuration of the air belt 11 and advantages that may be obtained, upon being inflated or restraining the occupant, due to the sectional configuration will be described with reference to FIGS. 4 and 5. As illustrated in FIG. 4, the slide guide 30 includes hard members 31 as a high rigidity region and a soft member 32 as a low rigidity region. The hard members define a space to cause the webbing W to be inserted and passed therein. The soft member retains multiple hard members 31, extending in the longitudinal direction of the webbing W, at predetermined intervals, and allows the webbing W to be freely bent in the longitudinal direction. Further, the airbag 20 is attached to the occupant P side of the slide guide 30 through the soft member 32, and is folded in an elongated manner to surround the slide guide 30 with the airbag 20 extending to each side of the slide guide 30, and then is entirely covered with the outer cover 21. Thus, the slide guide 30 is made by integrating the high rigidity region that causes the webbing W to pass therethrough with the low rigidity region that is freely bent to fit for the body type of the occupant, and then is arranged over a predetermined range of the airbag 20 in the longitudinal direction thereof, thus allowing the folded bag body 24 to smoothly slide along the webbing W.

Since the airbag 20 is fixed to the occupant's side of the slide guide 30 and is folded to surround the slide guide 30, in the event of a collision, as illustrated in FIG. 5A, the webbing W is introduced to restrain the occupant P, and simultaneously, the airbag 20 is inflated between the webbing W and the occupant P while forming a predetermined flat shape. If an introduced amount of the webbing W increases in the state where the airbag 20 is inflated, as illustrated in FIG. 5B, a contact degree to the occupant P increases as the airbag 20 is deformed, and the effect of restraining the occupant may increase. Preferably, the slide guide 30 efficiently converts the increased tension of the webbing W into a pressing force in a direction (occupant direction) shown by an outline arrow in the drawing. However, even if the tension of the webbing W is increased by the high rigidity region having sufficient rigidity, the sectional deformation of the slide guide 30 is kept small, and the pressing force is distributed over the airbag 20, so that it is possible to restrain the occupant P in a wide surface of the airbag 20.

Hereinafter, the configuration of the slide guide 30 contributing to the slide behavior of the webbing W, a deformation behavior and the like will be described with reference to FIGS. 6 to 10. The slide guide 30 includes hard members 31 as a high rigidity region and a soft member 32 as a low rigidity region. The hard members define a space to cause the webbing W to be inserted and passed therein. The soft member retains multiple hard members 31, extending in the longitudinal direction of the webbing W, at predetermined intervals, and allows the webbing W to be freely bent in the longitudinal direction.

The present embodiment illustrated in FIGS. 6 to 10 employs a square column member as the hard member 31. The square column member has a seat-belt passage opening, an inner dimension of which is slightly larger than a width of the webbing W, is chamfered at a corner in a flat and round shape that is about 1.5 cm in a longitudinal direction thereof, and has a predetermined rigidity. The hard member 31 of such a shape has a high rigidity in the width direction of the webbing W, and an interval between neighboring hard members 31 in the longitudinal direction of the webbing W is set to 1 cm or less. In this embodiment, polyurethane resin is used as a resin material forming the hard member 31. In addition, as an appropriate material, polyester elastomer, polyamide resin, hard polyurethane resin, polyester resin, metal plate or the like may be used.

Embodiments illustrated in FIGS. 6 to 10 employ, as the soft member 32, an elongated strip-shaped member and line-shaped member, the width of which is substantially equal to that of the webbing W. In order to function as a configuration of the slide guide 30, the soft member is fixed in a range in the longitudinal direction of the tether 23 illustrated in FIG. 3 by bonding or sewing. According to the present embodiment, it is preferable to employ cloth having flexibility or a thin plate of synthetic resin, as the strip-shaped member constituting the soft member 32. FIGS. 6A, 6B-1 and 6B-2 illustrate an example where cloth is used as the strip-shaped member that is the soft member. Where the cloth is employed as the soft member 32, the tether 23 or a base fabric for airbag is used. Woven cloth of polyamide fiber is preferably used as a material of the tether 23 or the base fabric for airbag. FIGS. 7A, 7B-1, 7B-2, 7B-3, 7B-4, 7C-1 and 7C-2 illustrate an example using a synthetic resin plate as the strip-shaped member that is the soft member. A representative example of the synthetic resin material includes polyester elastomer. In addition, soft polyurethane resin, silicone elastomer, rubber (synthetic and natural) or the like may be used as a proper material. FIGS. 8A, 8B-1, 8B-2, and 8B-3 illustrate examples using various metal wires, synthetic resin wire, and synthetic fiber wire as well as steel stranded wire having both flexibility and rigidity, as the line-shaped member that is the soft member 32.

[Attaching Structure of Soft Member and Hard Member]

Hereinafter, the configuration of respective members will be described in detail with reference to the accompanying drawings (FIGS. 6 to 10).

Figure 6A:
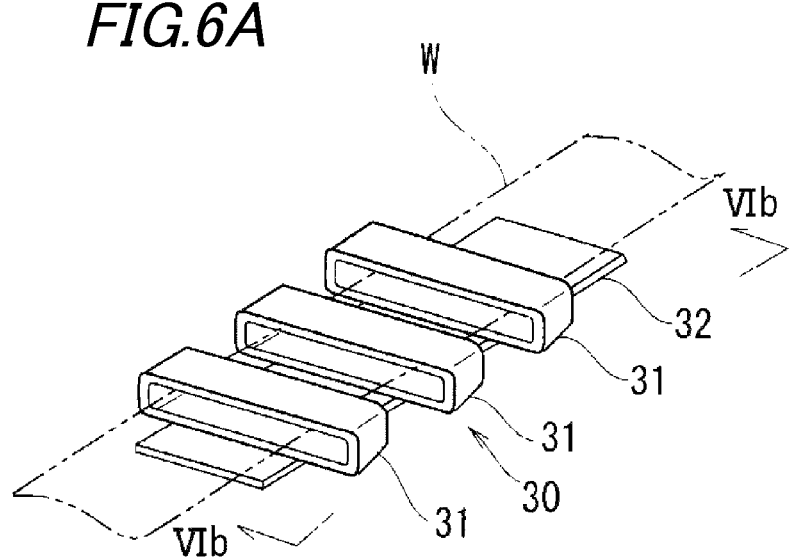
FIG. 6A is a partially enlarged perspective view illustrating an embodiment of a slide guide incorporated into the vehicle occupant restraint device.
Figures 1, 6B:
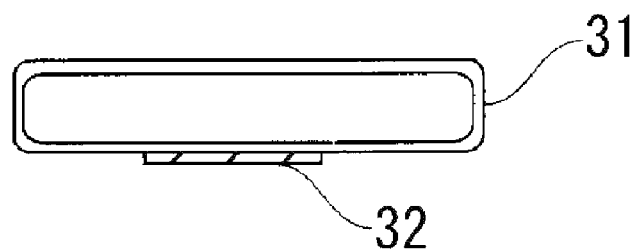

The slide guide illustrated in FIG. 6A is configured such that the square column member 31 (hereinafter, this member will be denoted by reference numeral 31) made of a hard resin material as the hard member is directly attached to a strip-shaped cloth 32 (hereinafter, this will be denoted by reference numeral 32) made of the same material as the base fabric for airbag or the tether as the soft member. As means for attaching each square column member 31 to the strip-shaped cloth 32 in a longitudinal direction thereof while maintaining a predetermined interval therebetween, bonding, welding (fusion) using the thermoplasticity of the hard resin material or the like are possible. Such an attaching structure is advantageous in that individual square column members 31 have only to be aligned on one piece of elongated cloth 32 for the purpose of integration, so that it is possible to manufacture a small number of light-weight slide guide 30. FIG. 6B-1 is a front view illustrating the slide guide 30 of FIG. 6A, and FIG. 6B-2 is a side view illustrating the slide guide 30 of FIG. 6A. As illustrated in the drawings, since neighboring hard members are continuously arranged by cloth, it is possible to provide the slide guide 30 having very high flexibility. As will be described later with reference to FIG. 9, the cloth 32 may be directly used as the soft member for the tether 23 or the bag body 24 surrounding the airbag 20. In that case, as compared to the cloth of a narrow width illustrated in FIG. 6A, it is difficult to attach the square column members 31 linearly in a row, but positioning may be facilitated by preparing a simple guide ruler.

Figure 7A:
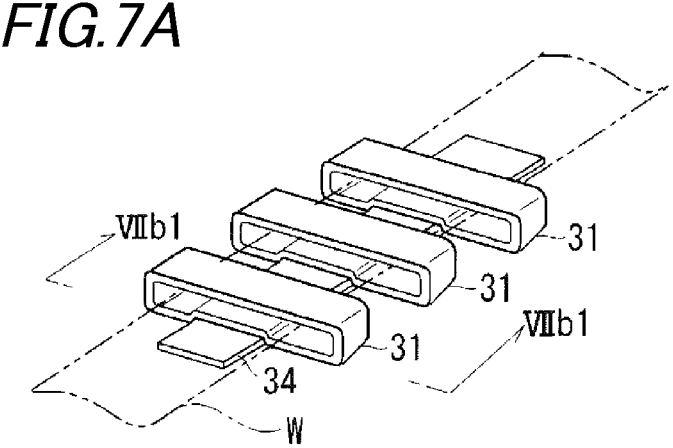
FIG. 7A is a partially enlarged perspective view illustrating another embodiment of the slide guide.
Figures 1, 7B:
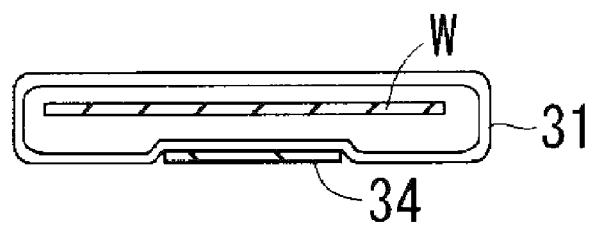
Figures 2, 7B:
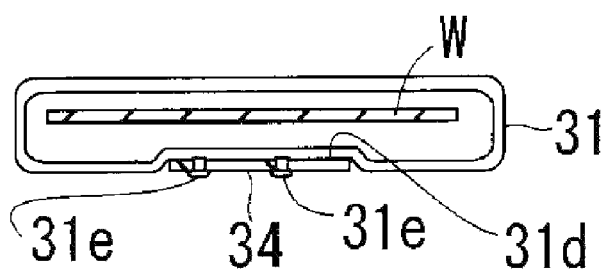
Figures 3, 7B:
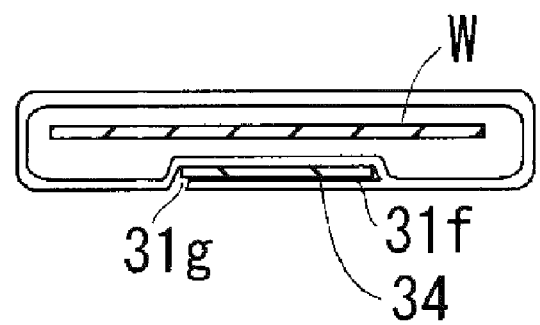
Figures 4, 7B:
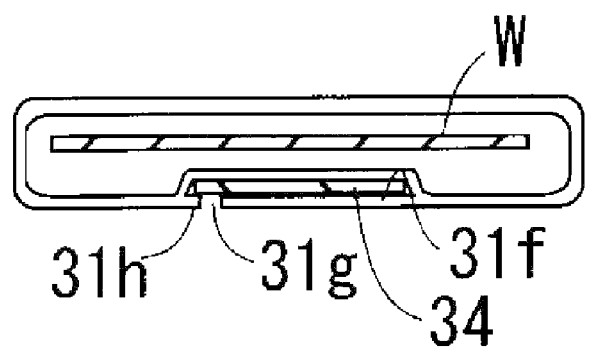

FIGS. 7A, 7B-1, 7B-2, 7B-3, 7B-4, 7C-1 and 7C-2 illustrate a structural example where the square column members 31 made of the hard resin material as a webbing sliding part disclosed in Patent Literature 2 and a base member 34 connecting the square column members 31 to be spaced apart from each other at a predetermined interval and made of the soft resin material are integrally formed, or the slide guide 30 manufactured by fitting is further improved. FIG. 7A is an example where the square column members 31 made of the hard resin material and the base member 34 connecting the square column members 31 to each other and made of the soft resin material are formed in two-color molding, thus manufacturing the slide guide 30. As illustrated in FIG. 7B-1, the hard resin material and the soft resin material are thermally fused to be simultaneously molded (two-color molding). This manufacturing method may achieve a reduction in multiple steps such as mold setting, in addition to increasing bonding strength between the hard resin material and the soft resin material. Further, the base member 34 is formed to be narrower than the square column member 31, so that it is possible to obtain effects of reducing the entire weight of the slide guide 30, improving flexibility, and reducing manufacturing cost.

FIG. 7B-2 illustrates an example where the hard resin material is connected with the soft resin material by a mechanical coupling means. In this connection example, a base-member receiving recess 31d and a connecting dowel 31e are integrally formed on a bottom side of the square column member 31, and a dowel fastening hole is formed at a predetermined position of the base member 34. Further, it is possible to easily position the square column member 31 on the base member 34 by fitting the connecting dowel 31e into the dowel fastening hole. A front end of the dowel 31e protruding from a lower surface of the base member 34 is thermally melted and crushed to be integrated with the base member 34 via a caulking structure, thus allowing the square column member 31 to be reliably secured to a predetermined position of the base member 34.

Figures 1, 7C:
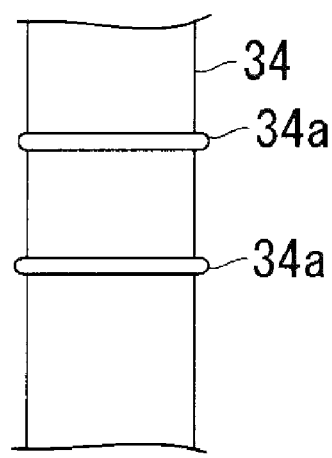
Figures 2, 7C:
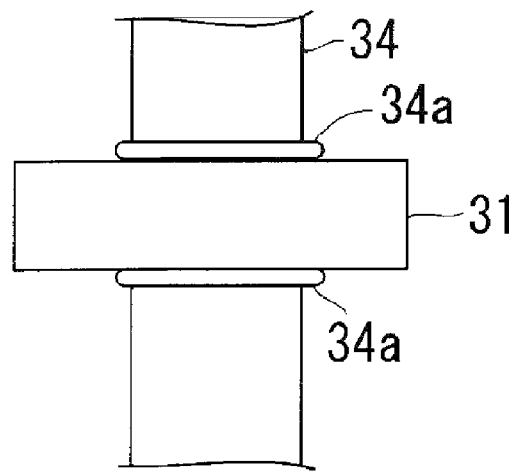

FIGS. 7B-3 and 7B-4 illustrate a connection example where a base-member receiving pocket 31f is integrally formed on an external lower surface of the square column member 31, and the base member 34 is received in the base-member receiving pocket 31f to be retained. The base-member receiving pocket 31f includes a recess corresponding to the width and thickness of the base member 34. The base member 34 may be slidably inserted from the slit 31g of the base-member receiving pocket 31f into the pocket. A locking claw 31h is formed on an end of the slit 31g of the base-member receiving pocket 31f illustrated in FIG. 7B-4. Therefore, this is higher in performance of retaining the base member 34 than the base-member receiving pocket 31f of FIG. 7B-3. As illustrated in FIGS. 7C-1 and 7C-2, the positioning stopper 34a is formed at every position of the base member 34 for fixing the square column member 31. The positioning stopper 34a is made by increasing a width of a portion of the base member 34 or increasing a plate thickness. The positioning stopper 34a allows the attached position of the square column member 31 to be easily confirmed, and enhances the efficiency of work.

Figure 8A:
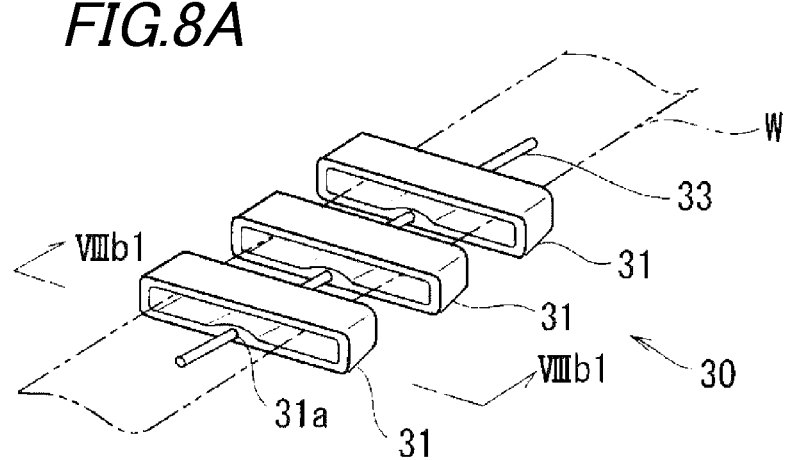
FIG. 8A is a partially enlarged perspective view illustrating another embodiment of the slide guide.
Figures 1, 8B:
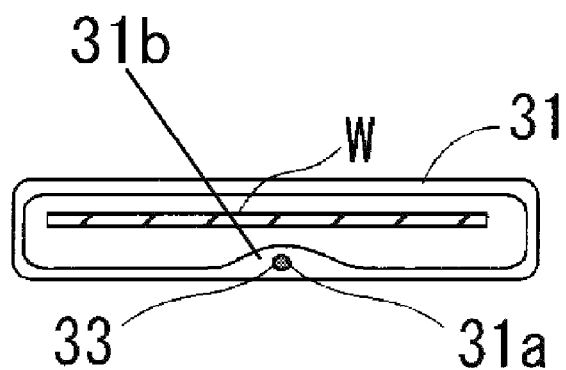
Figures 2, 8B:
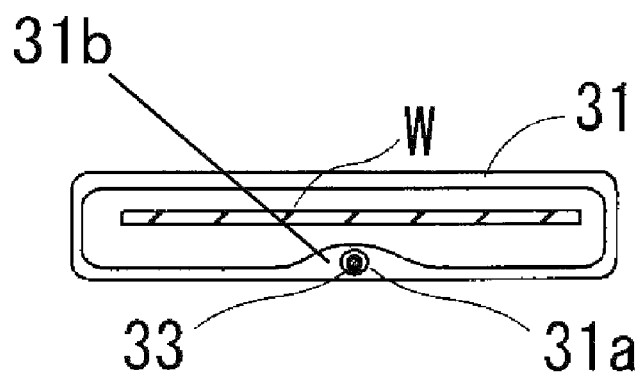
Figures 3, 8B:
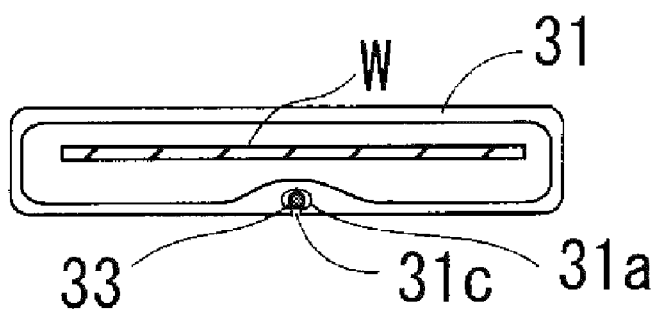

FIG. 8A illustrates an embodiment using a line-shaped member as the soft member. The slide guide 30 of this embodiment is configured such that an insertion hole 31a is formed in the bottom side of the square column member 31 as the hard member, one wire 33 is used as the line-shaped member, and multiple square column members 31 are arranged at predetermined positions on the wire 33 extending along the airbag 20. The connecting structure of attaching the square column member 31 to the wire 33 may adopt the slide guide 30 formed as illustrated in FIG. 8B-1: when the square column member 31 having a wire attachment region 31b is formed inside the bottom side of the square column member 31, the wire 33 may be integrally embedded in the wire attachment region 31b. In this case, since the wire 33 is integrated into the wire attachment region 31b of the square column member 31, the slide guide 30 may be manufactured in a single molding step. According to another structural example, as illustrated in FIG. 8B-2, the square column member 31 is molded such that the insertion hole 31a which is larger in diameter than the wire is previously formed in the wire attachment region 31b, the wire 33 passes through the insertion hole 31a in a next step, and consequently the square column members 31 may be fixedly produced at a predetermined interval in a predetermined range of the wire 33. It is preferable to form a slit 31c communicating with the wire insertion hole 31a in an outer surface of the wire attachment region 31b, as means for simply attaching the square column member 31 to the wire 33. The wire 33 is accommodated in the wire insertion hole 31a through the slit 31c. The wire 33 basically uses a steel stranded wire 33 of a small diameter as the line-shaped member, but a resin-coated steel stranded wire 33 may be preferably used to enhance durability. In order to reduce the weight of the slide guide 30, a carbon-fiber wire 33 may be used. In the manufacture examples of FIGS. 8B-2 and 8B-3, it is preferable to fix each square column member 31 to the wire 33 by filling a gap between the wire insertion hole 31a and the wire 33 with an adhesive.

Figures 2, 6B:
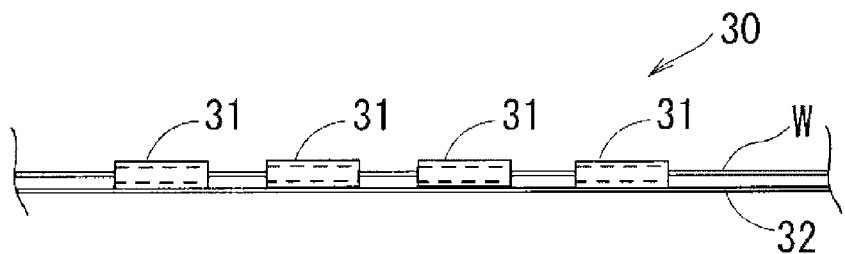
Figure 9:
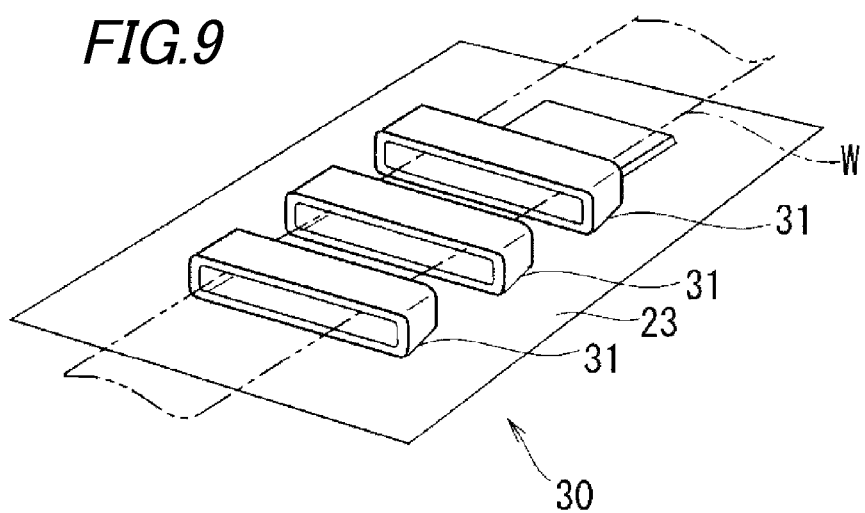
FIG. 9 is a partially enlarged perspective view illustrating another embodiment of the slide guide.
Figure 10A:
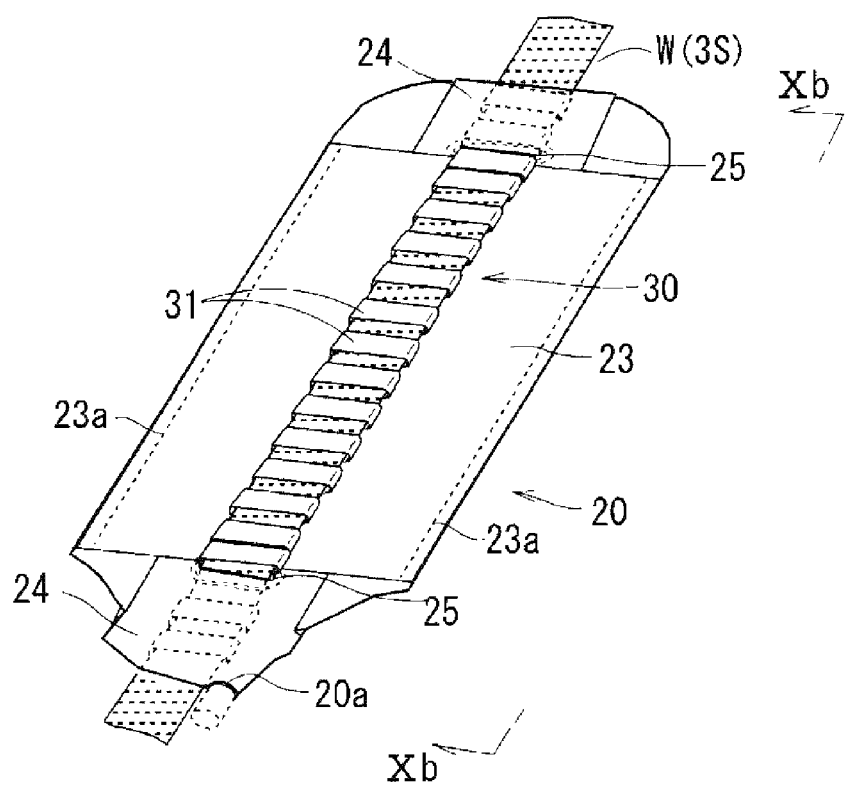
FIG. 10A is a partially enlarged perspective view illustrating another embodiment of the slide guide.
Figure 10B:
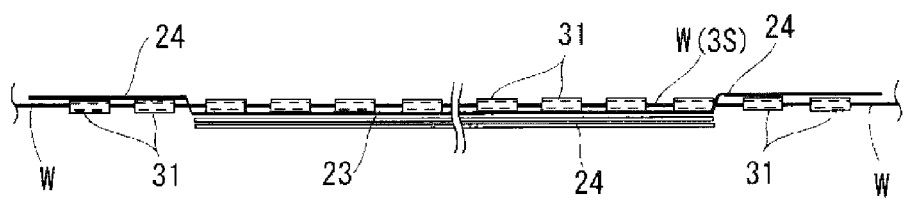
FIG. 10B is a side sectional view of the slide guide of FIG. 10A.

FIGS. 9, 10A and 10B illustrate modifications of the slide guide 30 illustrated in FIG. 6. The drawings illustrate a connection example where the strip-shaped cloth as the soft member illustrated in FIG. 6 is omitted and the tether 23 for retaining a shape when the airbag is inflated is directly used as the soft member. That is, since the tether 23 performs the function of the low rigidity region, the low rigidity member, such as the cloth as the strip-shaped member or the wire 33 as the line-shaped member, may be omitted, and the weight of parts and manufacturing cost thereof may be reduced. As an actual slide guide 30, the following configuration is employed as illustrated in FIG. 10A (having the substantially same configuration as FIG. 3): the square column members 31 as the hard member are aligned on and bonded to the surface of the tether 23 which is used to control the inflating shape of the airbag 20, at a predetermined interval.

Figure 11A:
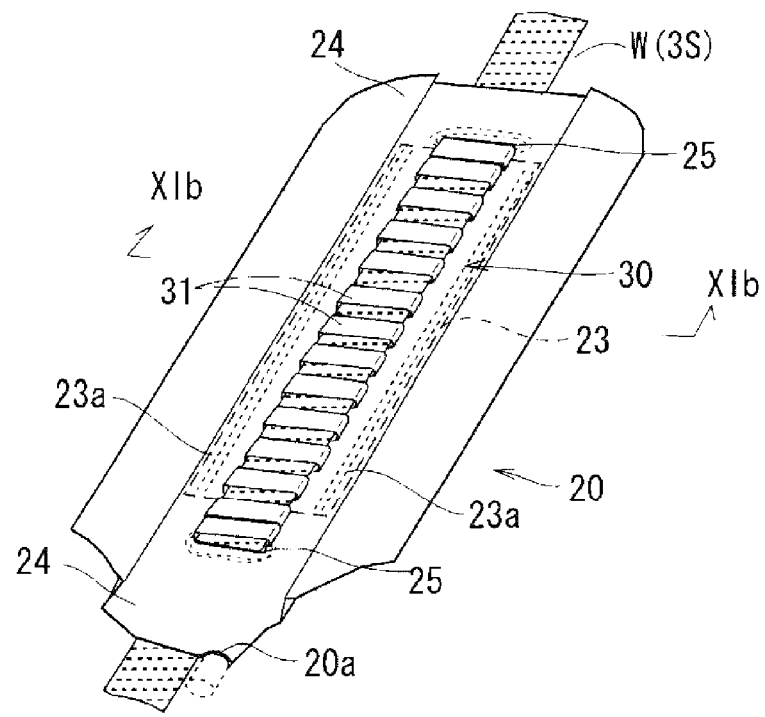
FIG. 11A is a partially enlarged perspective view illustrating another embodiment of the slide guide.
Figure 11B:
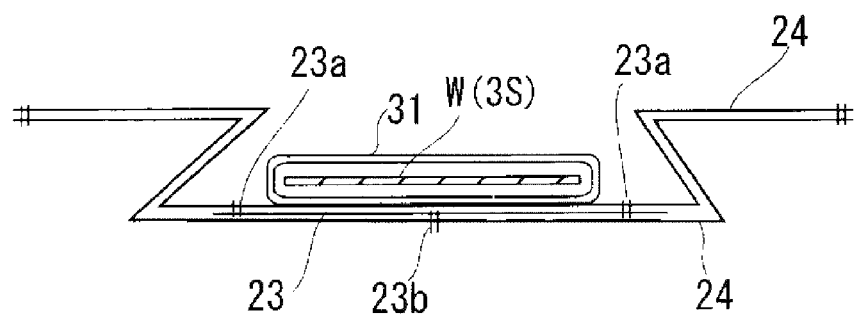
FIG. 11B is a sectional view of the slide guide of FIG. 11A.

FIGS. 11A and 11B illustrate a modification of the slide guide 30 illustrated in FIG. 6. The drawings illustrate a connection example where the strip-shaped cloth as the soft member illustrated in FIG. 6 is omitted and the bag body 24 of the airbag for retaining a shape when the airbag is inflated is directly used as the soft member. As illustrated in FIG. 11B, in this modification, the end 23a of the tether 23 is sewn onto two spots of an upper surface of the airbag body 24 in a state of being illustrated in the drawing, and a central portion 23b of the tether 23 is sewn onto one spot of a lower surface of the airbag body 24, thus allowing the tether 23 to be placed in the bag body 24. Therefore, the airbag body 24 itself may be the soft member. In the modifications illustrated in FIGS. 9, 10A, 10B, 11A and 11B, it is preferable to use a simple guide ruler or the like, in order to arrange and assemble the hard members, such as the square column members 31, on the tether 23 and the bag body 24 linearly at a predetermined interval in a row.

INDUSTRIAL APPLICABILITY

Various embodiments and modifications of the present invention may be made without departing from the broad spirit and scope of the present invention. Further, the above-described embodiments are intended to describe the invention but are not intended to limit the scope of the present invention. That is, the scope of the present invention is defined not by the embodiments but by the accompanying claims. Various changes made within the scope of the claims and equivalence thereof will be considered to be within the scope of this invention.

This application claims priority from Japanese Patent Application No. 2014-122938 filed on Jun. 14, 2014. The entire contents including specification, claims, and drawings of Japanese Patent Application No. 2014-122938 are incorporated herein by reference.

REFERENCE SIGNS LIST

1: occupant seat
2: retractor
3: seat belt
3S: shoulder belt
3L: lap belt

4: tongue
9: buckle
10: vehicle occupant restraint device (air belt device)
11: air belt
20: airbag
23: tether
24: bag body
30: slide guide
31: hard member
32: soft member

The invention claimed is:

1. A vehicle occupant restraint device comprising:
an airbag that is provided in a shoulder belt position of a seat belt to be capable of inflating upon receiving a predetermined actuating signal, the seat belt being wound by a single winding device,
wherein the airbag is folded to surround a slide guide including a high rigidity region and a low rigidity region, the high rigidity region having seat-belt passing portions arranged at predetermined intervals in an insertion direction of the seat belt, the low rigidity region supporting the high rigidity region, and the airbag slides along the seat belt through the slide guide when the seat belt is pulled out.

2. The vehicle occupant restraint device of claim 1, wherein the high rigidity region is a cylindrical member that is made of a hard member and has seat-belt passage openings arranged at a predetermined interval along a soft member as the low rigidity region extending in a longitudinal direction of the airbag.

3. The vehicle occupant restraint device of claim 2, wherein the soft member is a strip-shaped cloth member, and is connected to an outer surface of the hard member by bonding, welding or sewing.

4. The vehicle occupant restraint device of claim 2, wherein the soft member is a line-shaped member, and is connected to the hard member in a line-shaped member attachment region formed in a portion of the hard member.

5. The vehicle occupant restraint device of claim 2, wherein the soft member is a tether which restricts inflation of the airbag.

6. The vehicle occupant restraint device of claim 2, wherein the soft member is an airbag body.

7. The vehicle occupant restraint device of claim 1, wherein the high rigidity region of the slide guide is a molded body made of a hard resin material, and the low rigidity region thereof is a molded body made of a soft resin material.

8. The vehicle occupant restraint device of claim 7, wherein the slide guide is a molded product obtained by two-color molding of the hard resin material and the soft resin material.

9. The vehicle occupant restraint device of claim 7, wherein the molded product of the hard resin material of the slide guide and the molded product of the soft resin material thereof are connected to each other by a mechanical connecting unit.

10. The vehicle occupant restraint device of claim 9, wherein the mechanical connecting unit is either of a caulking structure or a fitting structure.

* * * * *